(12) United States Patent
Iikubo et al.

(10) Patent No.: US 8,156,927 B2
(45) Date of Patent: Apr. 17, 2012

(54) COMBUSTION CHAMBER STRUCTURE FOR DIRECT INJECTION DIESEL ENGINE

(75) Inventors: Shotaro Iikubo, Hino (JP); Hiroshi Nakajima, Hino (JP); Yusuke Adachi, Hino (JP); Kiyohiro Shimokawa, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 909 days.

(21) Appl. No.: 12/278,581

(22) PCT Filed: Feb. 7, 2007

(86) PCT No.: PCT/JP2007/000060
§ 371 (c)(1),
(2), (4) Date: Aug. 7, 2008

(87) PCT Pub. No.: WO2007/091389
PCT Pub. Date: Aug. 16, 2007

(65) Prior Publication Data
US 2009/0025675 A1 Jan. 29, 2009

(30) Foreign Application Priority Data

Feb. 8, 2006 (JP) .................................. 2006-030936

(51) Int. Cl.
*F02B 23/00* (2006.01)
(52) U.S. Cl. ........................................ 123/661; 123/664
(58) Field of Classification Search .................. 123/657, 123/661–667
See application file for complete search history.

(56) References Cited

U.S. PATENT DOCUMENTS

| 6,314,933 | B1 | 11/2001 | Iijima et al. |
| 6,935,301 | B2 * | 8/2005 | Liu ............................... 123/294 |
| 7,185,614 | B2 * | 3/2007 | Meffert et al. ............. 123/41.35 |
| 7,415,963 | B2 * | 8/2008 | Chmela et al. ................ 123/661 |
| 2004/0123832 | A1 * | 7/2004 | Quigley et al. ............... 123/276 |
| 2005/0115537 | A1 | 6/2005 | Liu |

FOREIGN PATENT DOCUMENTS

| FR | 2 868 480 | 10/2005 |
| JP | 53 22642 | 6/1978 |
| JP | 56 106022 | 8/1981 |
| JP | 5 71347 | 3/1993 |

(Continued)

*Primary Examiner* — Noah Kamen
(74) *Attorney, Agent, or Firm* — Oblon, Spivak, McClelland, Maier & Neustadt, L.L.P.

(57) ABSTRACT

A combustion chamber structure for a direct injection diesel engine is provided which can increase recirculated amount of exhaust gas while avoiding generation of black smoke and deterioration of fuel efficiency as much as possible.

Disclosed is a combustion chamber structure for a direct injection diesel engine having a cavity 10 on a top surface of a piston 9. The cavity is concave to provide a majority of the combustion chamber. Fuel is injected from a center of a cylinder top radially into an inner periphery of the cavity 10 to self-ignite. A depression 24 is formed at an outer periphery of the cavity 10 and is sunken relative to the top surface of the piston 9 to provide a step. The depression 24 has a bottom with an outer periphery gradually rising radially outwardly in modestly curved surface to the top surface of the piston 9. The inlet lip 11 is formed at a position lower than the top surface of the piston 9 by an inner periphery of the bottom of the depression 24 and a combustion chamber wall 12 rising from a bottom of the cavity 10.

1 Claim, 11 Drawing Sheets

FOREIGN PATENT DOCUMENTS

| | | |
|---|---|---|
| JP | 6 212973 | 8/1994 |
| JP | 7 150944 | 6/1995 |
| JP | 2000 220520 | 8/2000 |
| JP | 2001 207853 | 8/2001 |
| JP | 2004 190573 | 7/2004 |
| JP | 2006 125388 | 5/2006 |
| WO | WO 2004/003368 A2 | 1/2004 |
| WO | WO 2004/003368 A3 | 1/2004 |

\* cited by examiner

COMBUSTION CHAMBER STRUCTURE FOR DIRECT INJECTION DIESEL ENGINE

TECHNICAL FIELD

The present invention relates to a combustion chamber structure for a direct injection diesel engine.

BACKGROUND ART

For example, some diesel engines for automobiles have employed so-called exhaust gas recirculation (EGR) which extracts part of exhaust gas from an exhaust side to return the same to an intake side. The exhaust gas returned to the intake side suppresses combustion of fuel in the engine, thereby lowering the combustion temperature to reduce generation of $NO_x$.

Figure 1:
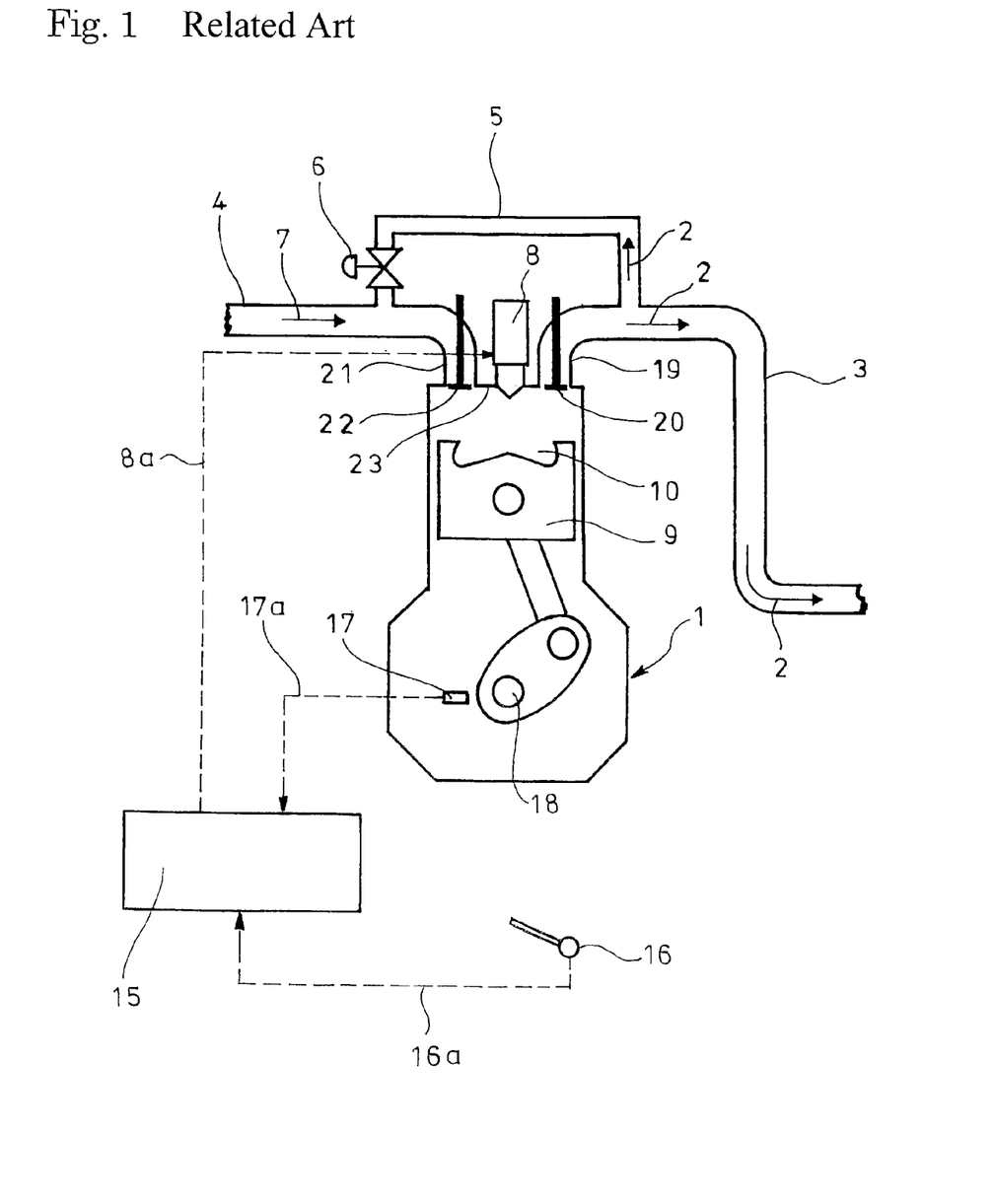
FIG. 1 is a schematic view showing a diesel engine with a mechanism for recirculation of exhaust gas.

FIG. 1 shows an example of a diesel engine with a mechanism for recirculation of exhaust gas. In the diesel engine 1 shown, exhaust and intake passages 3 and 4 for communication of exhaust gas 2 are interconnected through an EGR pipe 5 having an EGR valve 6 through which the exhaust gas 2 is partly recirculated together with intake air 7 into each of cylinders for the diesel engine 1 so as to lower the combustion temperature in the cylinder and reduce the generation of $NO_x$.

Each cylinder of the diesel engine 1 has a top (cylinder top 23) with a porous injector 8 for injection of fuel (diesel oil) into the cylinder, and a piston 9 having a top surface with a cavity 10 concave to provide a majority of a combustion chamber. To an inner periphery of the cavity 10, the fuel is radially injected via a tip of the injector 8 to self-ignite due to higher temperature in the cylinder during telophase of a compression stroke.

Figure 2:
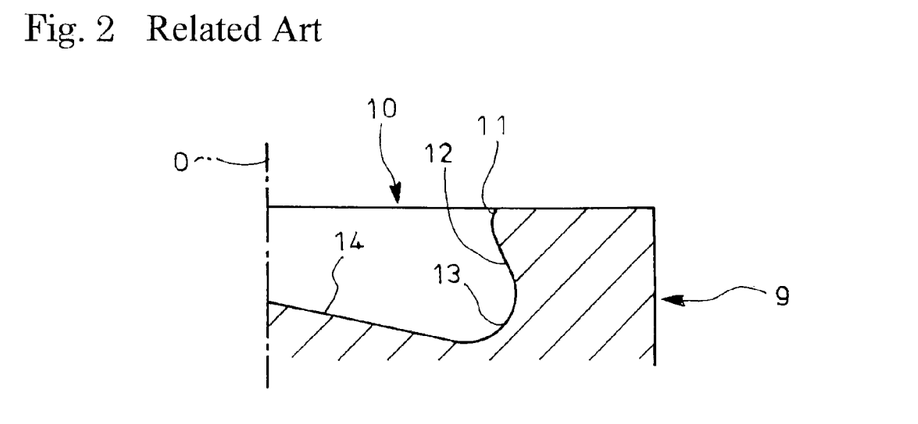
FIG. 2 is a sectional view showing particulars of a cavity shown in FIG. 1.
Figure 3:
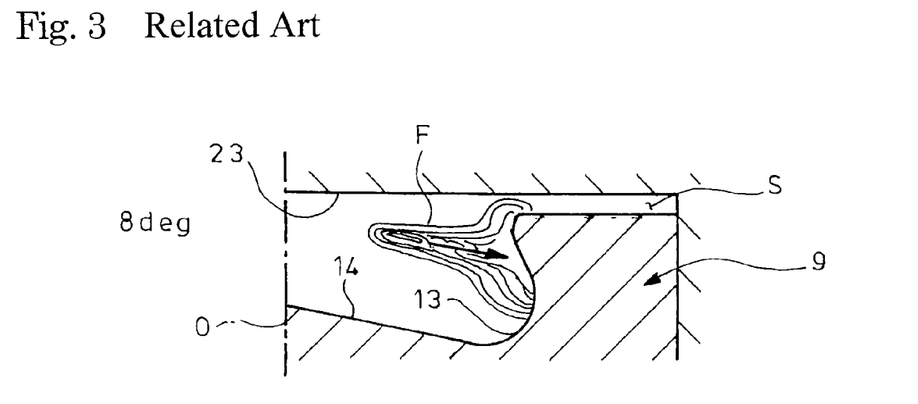
FIG. 3 is a view showing conventional fuel dispersion at crank angle 8° during a low r.p.m. operation.
Figure 4:
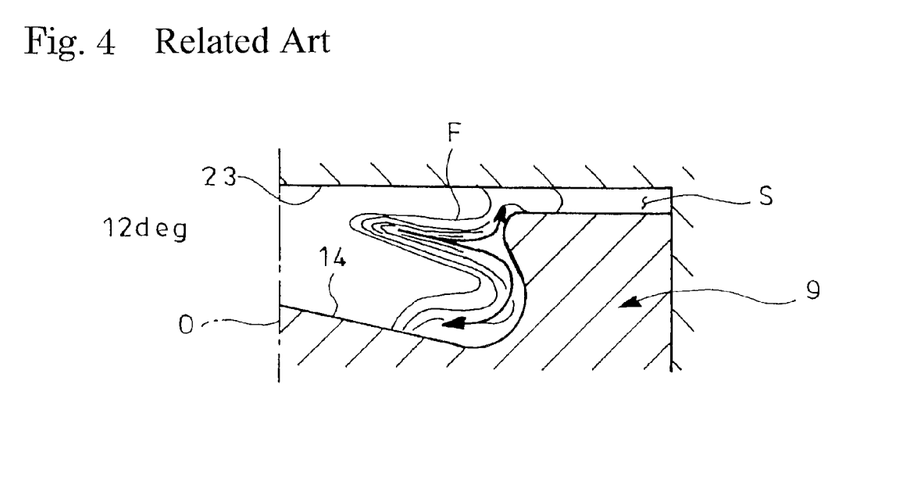
FIG. 4 is a view showing conventional fuel dispersion at crank angle 12° during the low r.p.m. operation.
Figure 5:
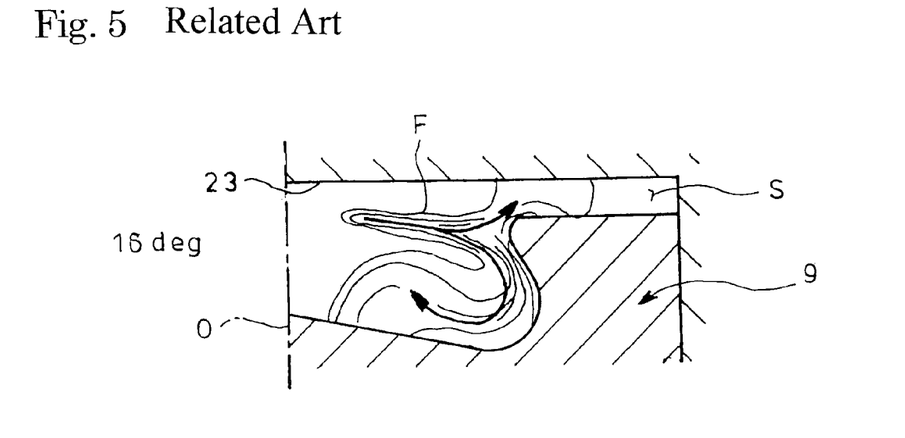
FIG. 5 is a view showing conventional fuel dispersion at crank angle 16° during the low r.p.m. operation.
Figure 6:
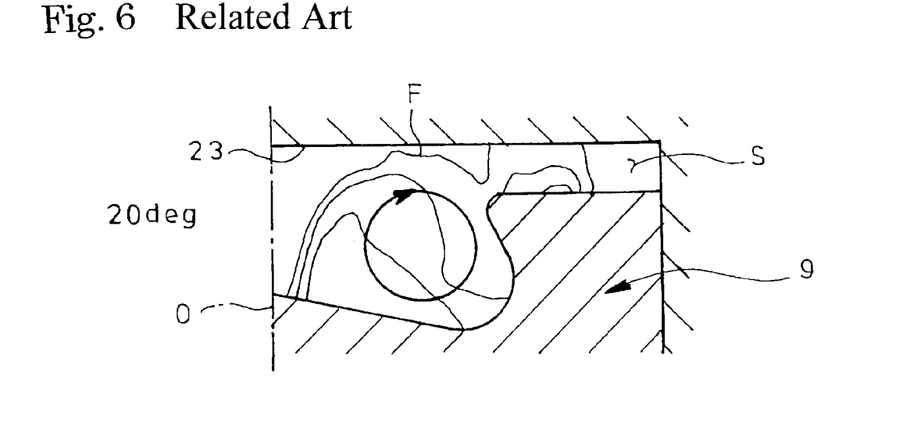
FIG. 6 is a view showing conventional fuel dispersion at crank angle 20° during the low r.p.m. operation.
Figure 7:
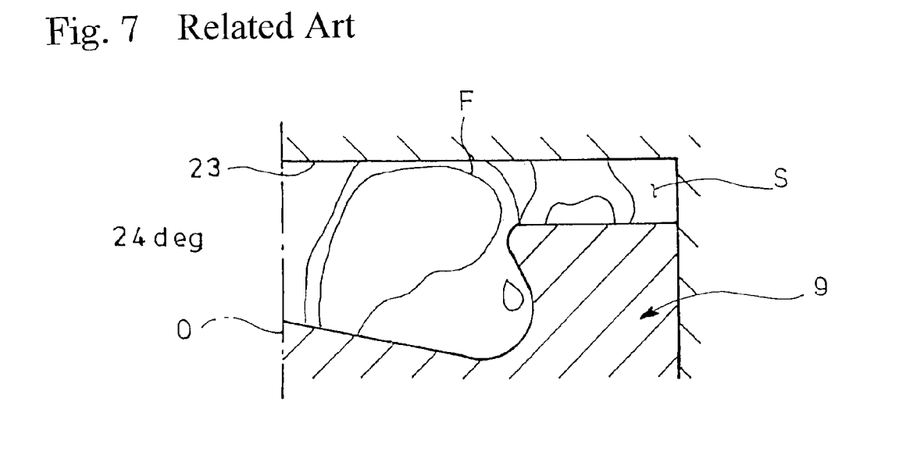
FIG. 7 is a view showing conventional fuel dispersion at crank angle 24° during the low r.p.m. operation.
Figure 8:
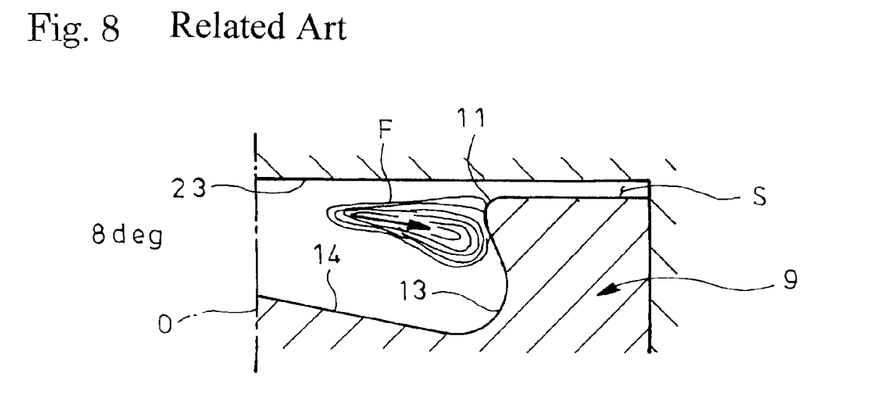
FIG. 8 is a view showing conventional fuel dispersion at crank angle 8° during a high r.p.m. operation.
Figure 9:
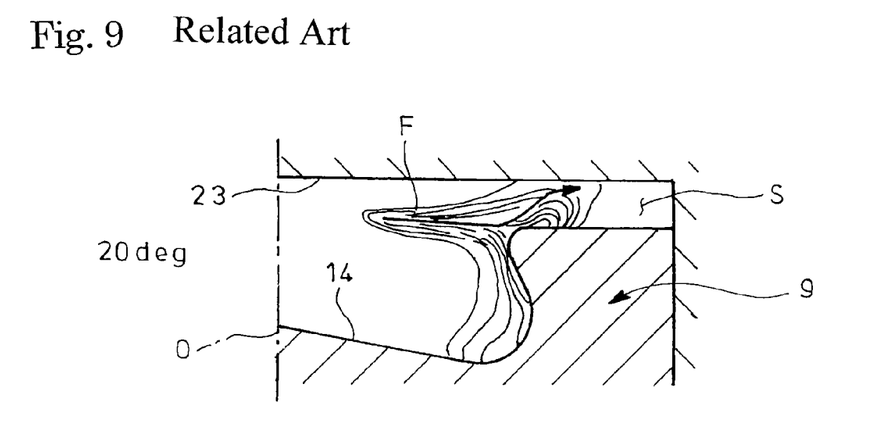
FIG. 9 is a view showing conventional fuel dispersion at crank angle 20° during the high r.p.m. operation.
Figure 10:
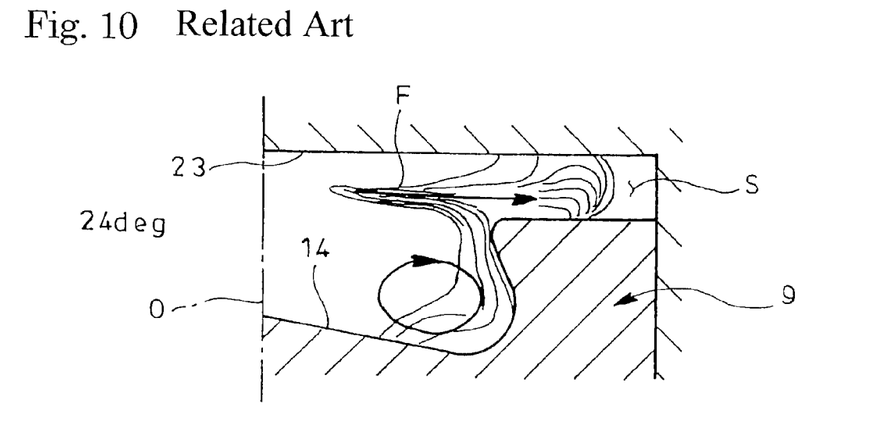
FIG. 10 is a view showing conventional fuel dispersion at crank angle 24° during the high r.p.m. operation.
Figure 11:
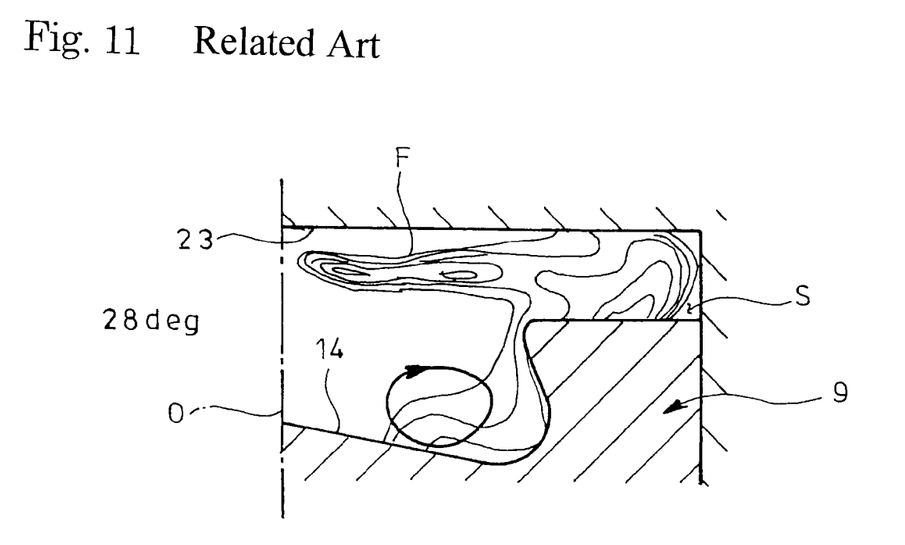
FIG. 11 is a view showing conventional fuel dispersion at crank angle 28° during the high r.p.m. operation.
Figure 12:
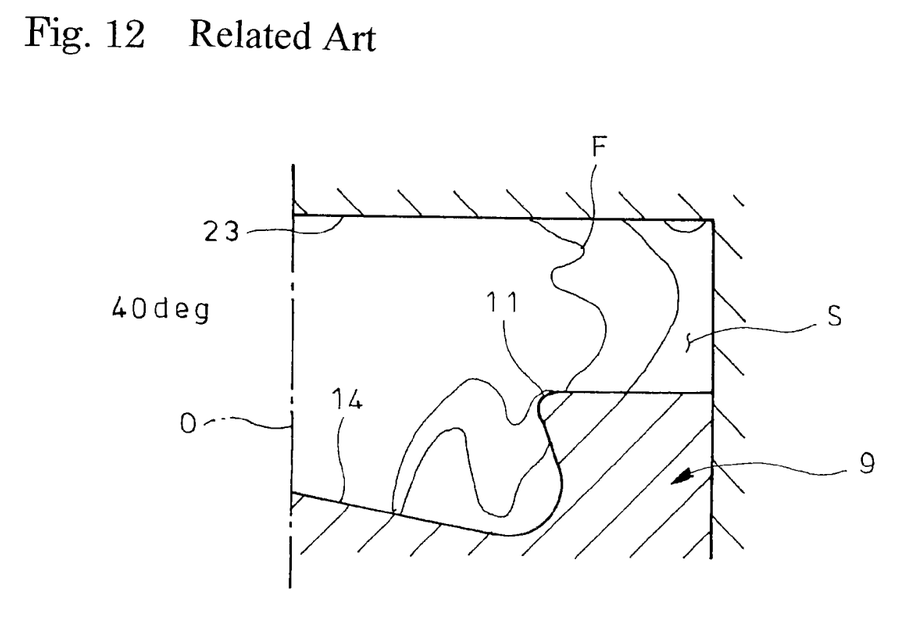
FIG. 12 is a view showing conventional fuel dispersion at crank angle 40° during the high r.p.m. operation.

Particulars of the cavity 10 are as shown in FIG. 2. The cavity 10 is constituted by an inlet lip 11 which provides an outer edge of opening of the cavity 10, a combustion chamber wall 12 which extends down from the lip 11 in moderate S-shaped curve to protrude radially outwardly of the lip 11, an outer curved portion 13 extending from the wall 12 radially inwardly in moderate curved surface and a center cone 14 which is flatly conical and extends from an entire lower end circumference of the portion 13 to a piston center O.

Injection by the injector 8 in the diesel engine 1 shown in FIG. 1 is controlled by a fuel injection command 8a from a controller 15 which constitutes an engine-controlling computer (ECU: Electronic Control Unit) such that the command 8a is outputted to the injector 8 around compressive upper dead center so as to inject the fuel.

Inputted to the controller 15 are, for example, an accelerator stepped-in signal 16a from an accelerator sensor 16 (load sensor) for detection of an accelerator stepped-in degree as load to the diesel engine 1 and a revolution number signal 17a from a revolution number sensor 17 for detection of revolution number of the engine 1. Thus, operational conditions of the diesel engine 1 are monitored all the times so as to conduct various engine controls.

In FIG. 1, reference numeral 18 denotes a crank shaft; 19, an exhaust port; 20, an exhaust valve; 21, an intake port; 22, an intake valve; and 23, the cylinder top. The intake and exhaust valves 22 and 20 are controlled to be opened by cams on engine-driven cam shafts through push rods and rocker arms (not shown) at appropriate timings depending upon strokes of the respective cylinders.

This kind of conventional combustion chamber structure for a direct injection diesel engine has been proposed, for example, in the following References 1 and 2.

[Reference 1] JP 6-212973A
[Reference 2] JP 7-150944A

SUMMARY OF THE INVENTION

Problems to be Solved by the Invention

However, in the conventional direct injection diesel engine as shown in FIG. 1, reduction in generation of $NO_x$ through recirculation of the exhaust gas 2 is in trade-off relationship with generation of black some due to insufficient combustion in the cylinders so that mere increase in recirculated amount of the exhaust gas 2 for substantial reduction in generation of $NO_x$ will result in generation of black smoke and degradation in fuel efficiency.

The inventors have keenly studied the existing combustion chamber structure as shown in FIG. 2, focusing attention on atomized fuel dispersion, to find out that during a low r.p.m. operation, as shown in FIGS. 3-7 (crank angles 8°, 12°, 16°, 20° and 24°, respectively) in the order named, the piston 9 is lowered slowly for a period of fuel injection so that the fuel injection is completed before the piston 9 is fully lowered. Thus, most of the atomized fuel is injected into and remains within the cavity 10, resulting in local formation of thick fuel zone and ease in generation of black smoke. Consecutive contours shown by F in the Figures schematically represent dispersion of injected fuel depending upon its concentrations and indicate that the inner the dispersion region is, the thicker the concentration of the fuel is.

They also found out that during a high r.p.m. operation, as shown in FIGS. 8-12 (crank angles 8°, 20°, 24°, 28° and 40°, respectively) in the order named, the piston 9 is lowered fast for the period of fuel injection so that the piston 9 is lowered extremely even in first half of fuel injection and thus most of the atomized fuel enters not into the cavity 10 but into a squish area S (an area between a top surface of the piston 9 around the cavity 10 and a cylinder top 23) and remains around a liner wall (at outermost portion of the squish area S) where thick fuel region is locally formed, resulting in ease in generation of black smoke.

The invention was made in view of the above and has its object to provide a combustion chamber structure for a direct injection diesel engine which can avoid generation of black smoke and deterioration in fuel efficiency even if recirculated amount of exhaust gas is increased.

Means or Measures for Solving the Problems

The invention is directed to a combustion chamber structure for a direct injection diesel engine having a cavity on a top surface of a piston, said cavity being concave to provide a majority of the combustion chamber, fuel being injected from a center of a cylinder top radially into said cavity to self-ignite, characterized in that it comprises a depression at an outer periphery of open of the cavity, said depression being sunken by a required depth relative to the top surface of the piston to provide a step, said depression having a bottom with an outer periphery gradually rising radially outwardly in modest curved surface to the top surface of the piston such that an inlet lip is formed at a position lower than the top surface of the piston and defined by an inner periphery of the bottom of said depression and a combustion chamber wall rising from a bottom of the cavity.

Thus, during a low r.p.m. operation, the piston is lowered slowly for a period of fuel injection so that the fuel injection from the center of the cylinder top radially into the cavity is completed before the piston is fully lowered. However, because of the inlet lip formed at the position lower than the top surface of the piston, the atomized fuel is blown against around the inlet lip in much of the injection period to be divided into a flow into the cavity and a flow into the depression.

The atomized fuel flowing into the depression is guided by the curved surface to provide upward flow as it is directed radially outwardly. This provided upward flow cooperates with the lowering of the piston to bring about vertical swirl around the top of the depression. The vertical swirl facilitates radially inward movement of the atomized fuel while vigor or force of injection remaining in the upward flow facilitates radially outward movement of the atomized fuel, thereby attaining good dispersion of the atomized fuel in the squish area.

Meanwhile, the atomized fuel blown against around the inlet lip and flowing into the cavity provides flow lowered along the combustion chamber wall to the bottom of the cavity and then directed radially inwardly along the bottom. These provided series of flows lowered and then directed radially inwardly cooperate with the lowering of the piston to bring about vertical swirl in the cavity. The swirl facilitates dispersion of the atomized fuel in the cavity, and the atomized fuel itself, which has been reduced in amount owing to partly flowing out to the depression, is readily dispersible, thereby preventing thick fuel region from being locally formed in the cavity.

During a high r.p.m. operation, the piston is lowered fast for the period of fuel injection so that the piston is lowered extremely even in first half of the fuel injection from the center of the cylinder top radially into the cavity. However, because of the inlet lip formed at the position lower than the top surface of the piston, the atomized fuel is blown against around the inlet lip in an early phase of the injection period to be divided into a flow into the cavity and a flow into the depression; thereafter, most of the atomized fuel is blown against the depression above the inlet lip to provide upward flow due to the curved surface of the depression. Counter swirls generate radially inside and outside of or on opposite sides of this upward flow and contribute to good dispersion of the atomized fuel in the squish area, so that thick fuel region is prevented from being locally formed around the liner wall of the squish area.

Meanwhile, the atomized fuel blown against around the inlet lip and flowing into the cavity provides a flow lowered along the combustion chamber wall to the bottom of the cavity and then directed radially inwardly along the bottom. These provided series of flows lowered and then directed radially inwardly cooperate with the lowering of the piston to bring about vertical swirl in the cavity. The swirl facilitates dispersion of the atomized fuel in the cavity.

In the invention, it is preferable that a nozzle cone angle for the fuel injection is in a range of 140°-160° and that width of the depression in the radiation direction is at least 9% and at most 19% of diameter of the inlet lip, depth of the inlet lip to the top surface of the piston being in at least 4.5% and at most 9.5% of the diameter of the inlet lip.

Effects Of The Invention

The above-mentioned combustion chamber structure for a direct injection diesel engine of the invention can exhibit various effects and advantages. A thick fuel region can be prevented from being locally formed in a cavity during a low r.p.m. operation and can be prevented from being locally formed around a liner wall in a squish area during a high r.p.m. operation; atomized fuel can be positively and extensively dispersed in the combustion chamber for good combustion. As a result, while avoiding generation of black smoke and deterioration of fuel efficiency as much as possible, recirculated amount of exhaust gas can be increased to a level unattainable by existing direct injection diesel engines so that $NO_x$ reduction effect can be obtained to a level unattainable by the prior art.

Explanation of the Reference Numerals 1 diesel engine
9 piston
10 cavity
11 inlet lip
12 combustion chamber wall
23 cylinder top 24 depression
L width of depression in radiation direction
d diameter of inlet lip
h depth of inlet lip relative to top surface of piston Best Mode For Carrying Out The Invention An embodiment of the invention will be disclosed in conjunction with the drawings.

FIGS. 13-27 show the embodiment of the invention in which parts similar to those in FIGS. 1 and 2 are represented by the same reference numerals.

Figure 13:
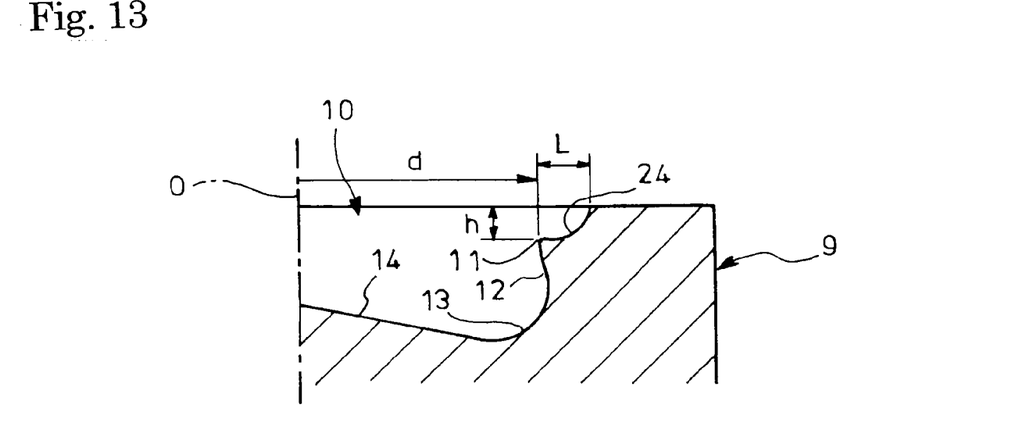
FIG. 13 is a sectional view showing an embodiment of the invention.
Figure 14:
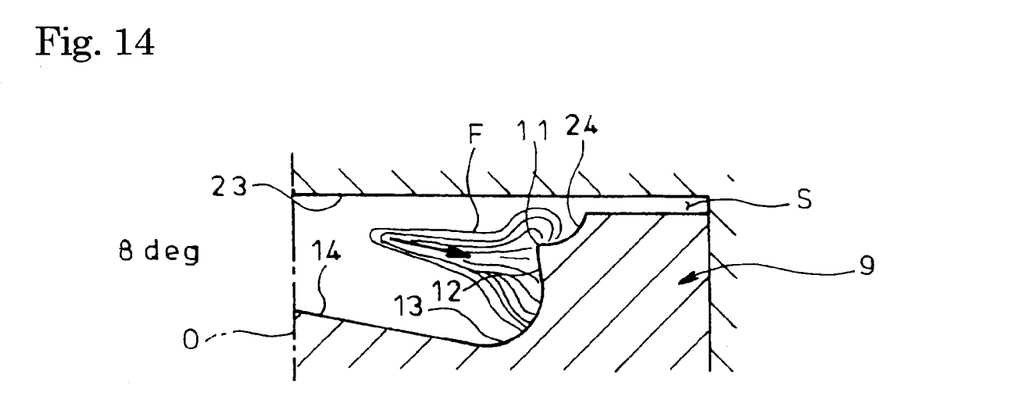
FIG. 14 is view showing fuel dispersion at crank angle 8° during a low r.p.m. operation.
Figure 15:
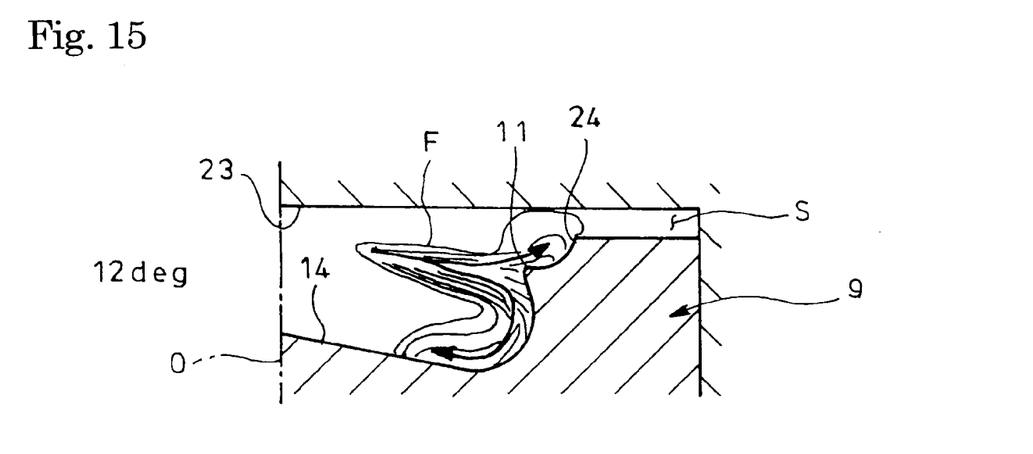
FIG. 15 is a view showing fuel dispersion at crank angle 12° during the low r.p.m. operation.
Figure 16:
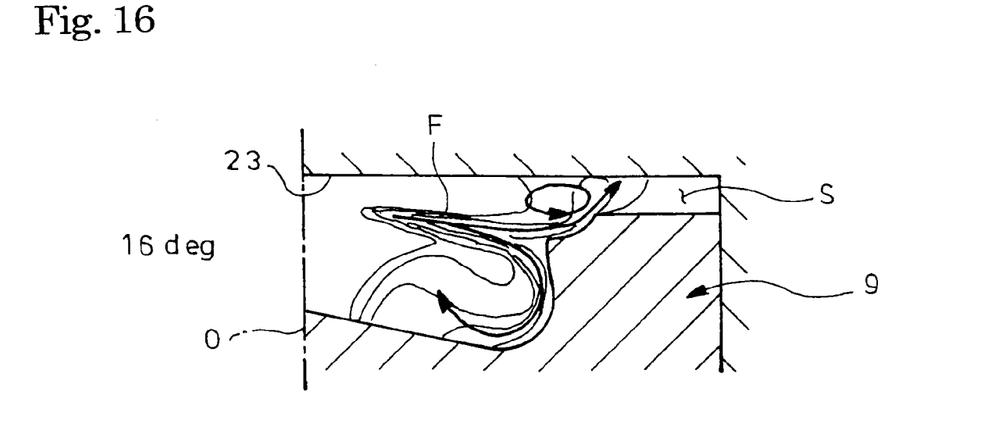
FIG. 16 is a view showing fuel dispersion at crank angle 16° during the low r.p.m. operation.
Figure 17:
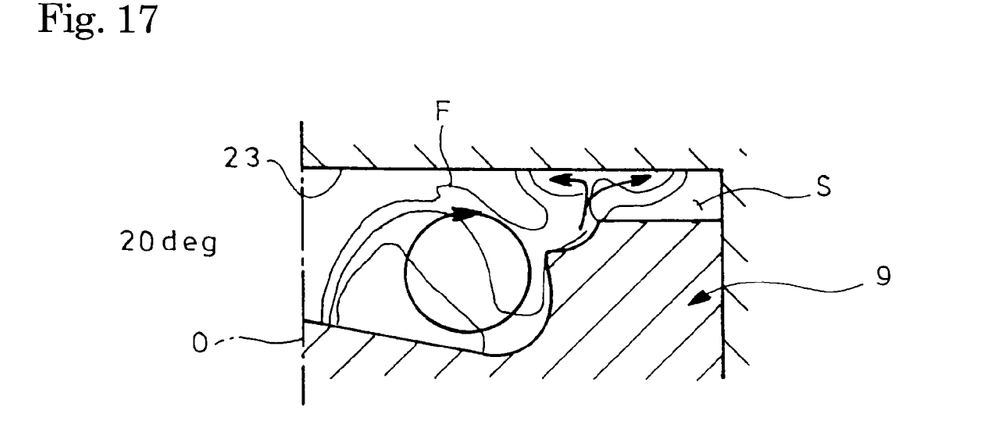
FIG. 17 is a view showing fuel dispersion at crank angle 20° during the low r.p.m. operation.
Figure 18:
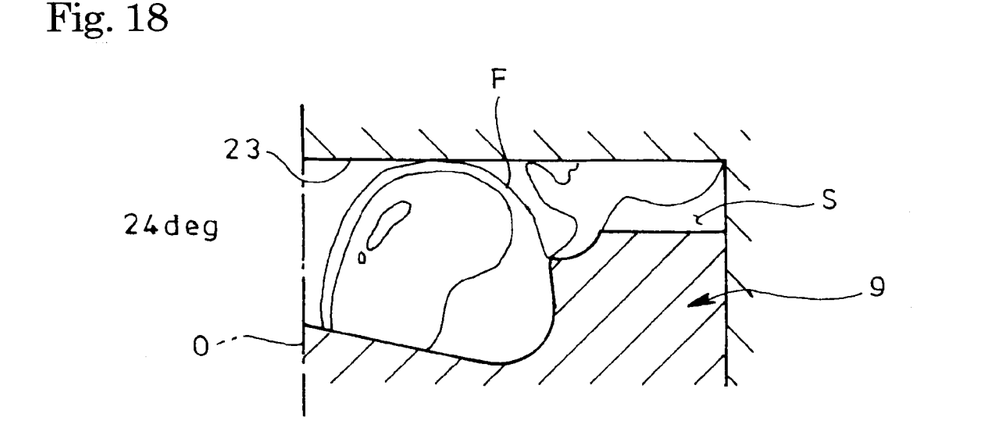
FIG. 18 is a view showing fuel dispersion at crank angle 24° during the low r.p.m. operation.
Figure 19:
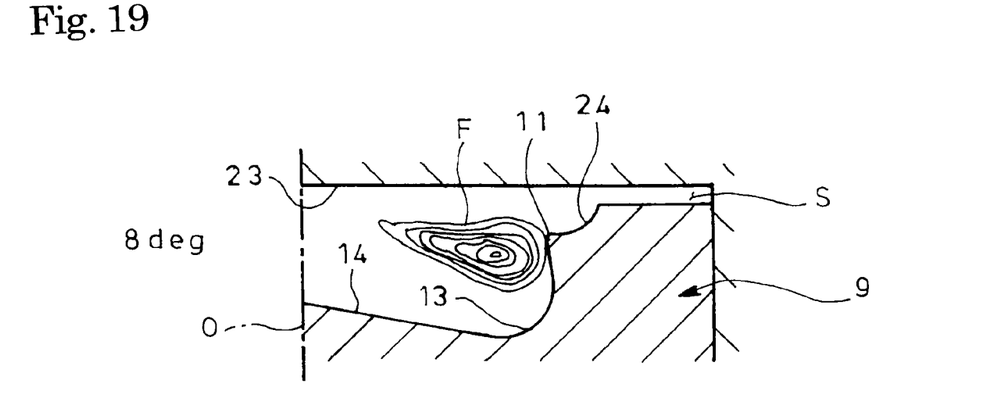
FIG. 19 is a view showing fuel dispersion at rank angle 8° during a high r.p.m. operation.
Figure 20:
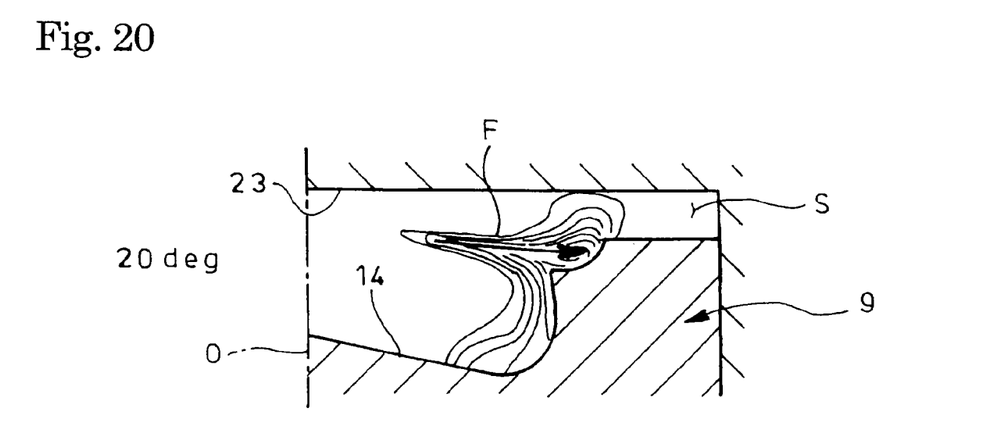
FIG. 20 is a view showing fuel dispersion at crank angle 20° during the high r.p.m. operation.
Figure 21:
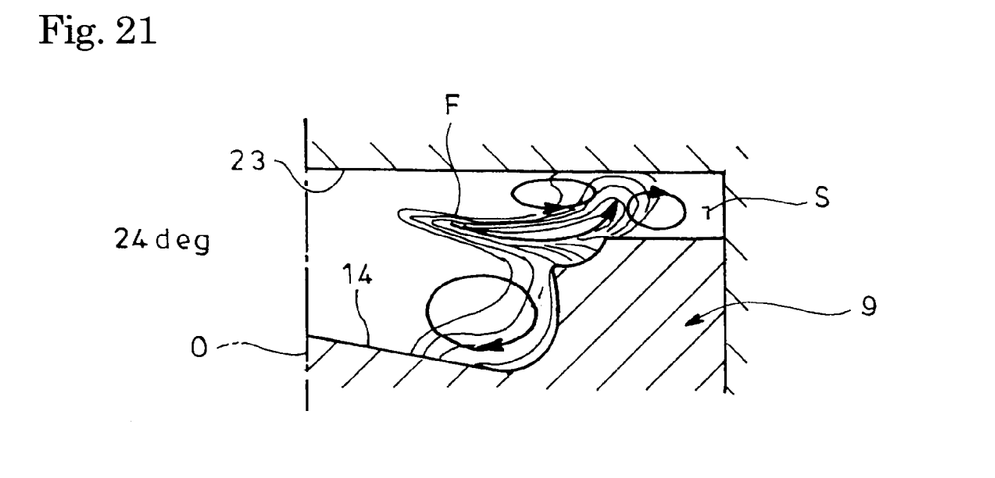
FIG. 21 is a view showing fuel dispersion at crank angle 24° during the high r.p.m. operation.
Figure 22:
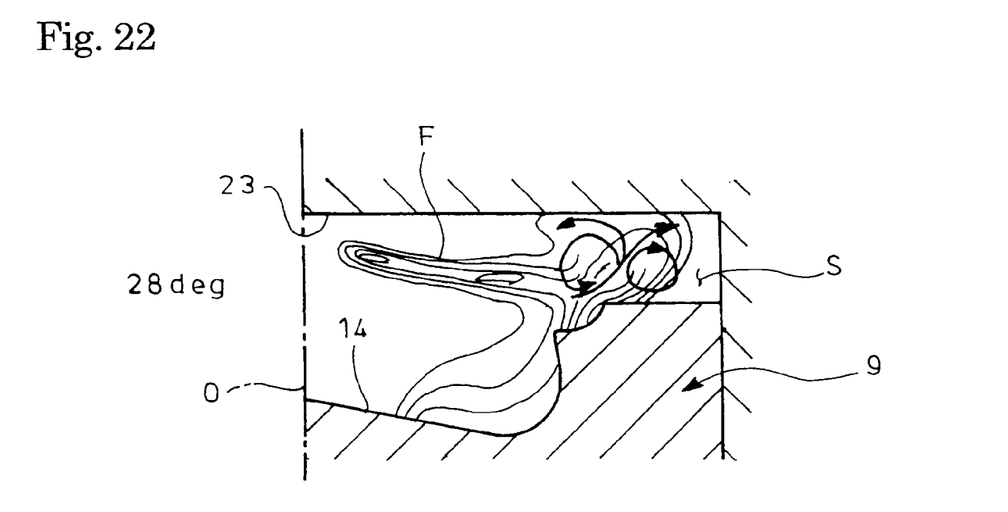
FIG. 22 is a view showing fuel dispersion at crank angle 28° during the high r.p.m. operation.
Figure 23:
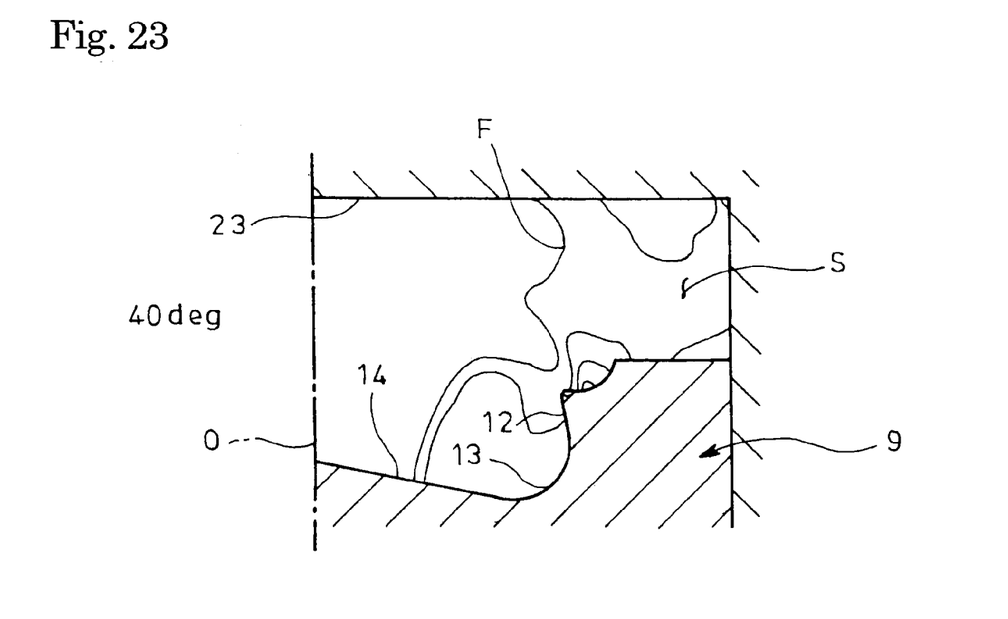
FIG. 23 is a view showing fuel dispersion at crank angle 40° during the high r.p.m. operation.

With respect to the direct injection diesel engine 1 as previously disclosed in FIG. 1, the embodiment is constructed as shown in FIG. 13 such that a depression 24 is formed at an outer periphery of open of a cavity 10 on a top surface of a piston 9, said depression 24 being sunken relative to the top surface of the piston 9 to provide a step, said depression 24 having a bottom with an outer periphery gradually rising radially outwardly in modestly curved surface to the top surface of the piston 9 such that an inlet lip 11 is formed at a position lower than the top surface of the piston by an inner periphery of the bottom of said depression 24 and a combustion chamber wall 12 rising from a bottom of the cavity 10.

The cavity 10 lower than the inlet lip 11 is contoured substantially similarly to the conventional cavity 10 previously disclosed with respect to FIG. 2 and is constituted by a combustion chamber wall 12 which extends from the inlet lip 11 downwardly in moderate S-shaped curve to protrude radially outwardly of the lip 11, an outer curved portion 13 extending from the wall 12 radially inwardly in moderately curved surface and a center cone 14 which is flatly conical and extends from an entire lower end circumference of the portion 13 to a piston center O.

When the nozzle cone angle for fuel injected from the injector 8 (see FIG. 1) of the cylinder top 23 for injection of fuel (diesel oil) is set to a range of 140°-160°, the width L of the depression 24 in the radiation direction is at least 9% and at most 19% of the diameter d of the inlet lip 11 and the depth h of the inlet lip 11 relative to the top surface of the piston 9 is at least 4.5% and at most 9.5% of the diameter d of the inlet lip 11.

Thus, with such combustion chamber structure, during a low r.p.m. operation as shown in FIGS. 14-18 (crank angles 8°, 12°, 16°, 20° and 24°, respectively) in the order named, the piston 9 is lowered slowly for a period of fuel injection so that the fuel injection from the center of the cylinder top 23 radially into the cavity 10 is completed before the piston 9 is fully lowered. However, in the invention, because of the inlet lip 11 formed at the position lower than the top surface of the piston 9, the atomized fuel is blown against around the inlet lip 11 in much of the injection period to be divided into a flow into the cavity 10 and a flow into the depression 24.

The atomized fuel flowing into the depression 24 is guided by the curved surface to provide an upward flow as it is directed radially outwardly. This provided upward flow cooperates with the lowering of the piston 9 to bring about vertical swirl around the top of the depression 24. The vertical swirl facilitates radially inward movement of the atomized fuel while vigor or force of injection remaining in the upward flow facilitates radially outward movement of the atomized fuel, thereby attaining good dispersion of the atomized fuel in a squish area S (an area between the top surface of the piston 9 around the cavity 10 and the cylinder top 23).

Meanwhile, the atomized fuel blown against around the inlet lip 11 and flowing into the cavity 10 provides flow lowered along the combustion chamber wall 12 to the bottom of the cavity 10 and then directed radially inwardly along the bottom. These provided series of flows lowered and then directed radially inwardly cooperate with the lowering of the piston 9 to bring about vertical swirl in the cavity 10. This swirl facilitates dispersion of the atomized fuel in the cavity 10, and the atomized fuel itself, which has been reduced in amount owing to partly flowing into the depression 24, is readily dispersible, thereby preventing thick fuel region from being locally formed in the cavity 10.

During a high r.p.m. operation, as shown in FIGS. 19-23 (crank angles 8°, 20°, 24°, 28° and 40°, respectively) in the order named, the piston 9 is lowered fast for the period of fuel injection so that the piston 9 is lowered extremely even in first half of the fuel injection from the center of the cylinder top 23 radially into the cavity 10. However, because of the inlet lip 11 formed at the position lower than the top surface of the piston 9, the atomized fuel is blown against around the inlet lip 11 in an early phase of the injection period to be divided into a flow into the cavity 10 and a flow into the depression 24; thereafter, most of the atomized fuel is blown against the depression 24 above the inlet lip 11 to provide upward flow due to curved surface of the depression 24. Counter swirls generate radially inside and outside of or on opposite sides of this upward flow and contribute to good dispersion of the atomized fuel in the squish area S, so that thick fuel region is prevented from being locally formed around the liner wall of the squish area S (outermost portion of the squish area S).

Meanwhile, the atomized fuel blown against around the inlet lip 11 and flowing into the cavity 10 provides flows lowered along the combustion chamber wall 12 to the bottom of the cavity 10 and then directed radially inwardly along the bottom. These provided series of flows lowered and then directly radially inwardly cooperate with the lowering of the piston 9 to bring about vertical swirl in the cavity 10. The swirl facilitates dispersion of the atomized fuel in the cavity 10.

Thus, according to the above embodiment, a thick fuel region can be prevented from being locally formed in a cavity 10 during a low r.p.m. operation and can be prevented from being locally formed around a liner wall in the squish area S during a high r.p.m. operation; atomized fuel can be positively and extensively dispersed in the combustion chamber for good combustion. As a result, while avoiding generation of black smoke and deterioration of fuel efficiency as much as possible, recirculated amount of exhaust gas 2 (see FIG. 1) can be increased to a level unattainable by existing direct injection diesel engines so that $NO_x$ reduction effect can be obtained to a level unattainable by the prior art.

Figure 24:
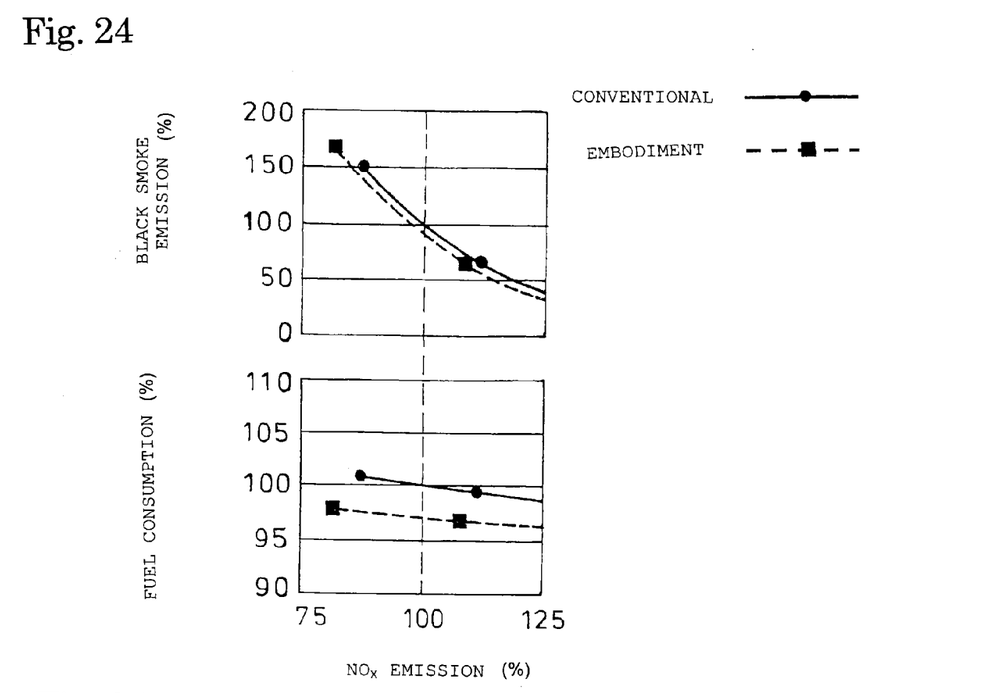
FIG. 24 is a graph showing results of verification experiments for low r.p.m. operation conducted by the inventors.
Figure 25:
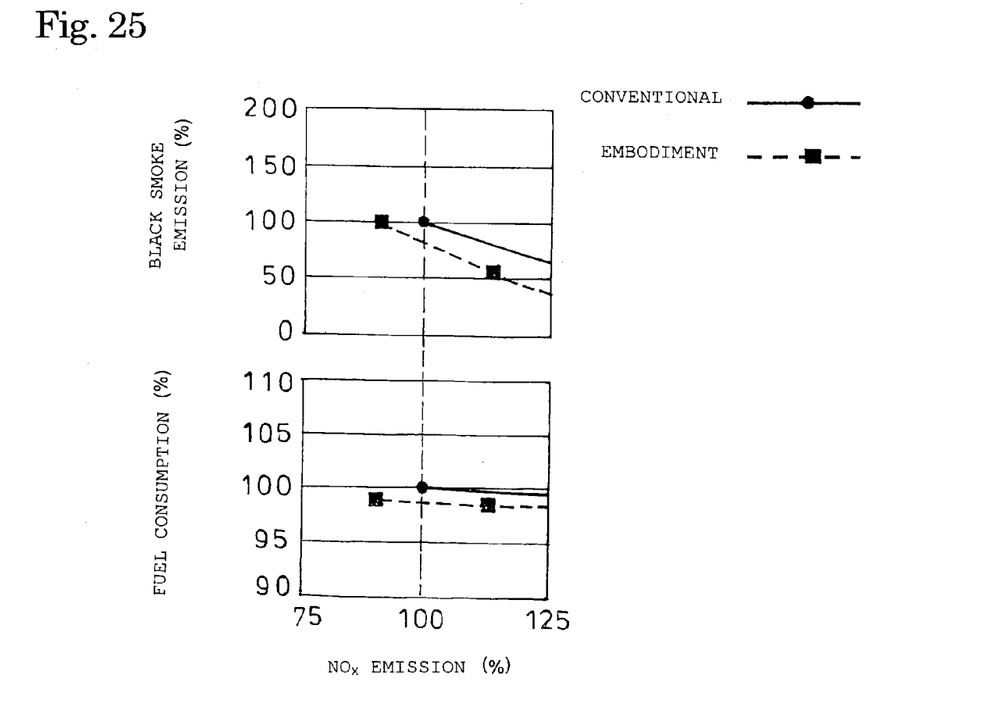
FIG. 25 is a graph showing results of verification experiments for high r.p.m. operation conducted by the inventors.

In fact, verification experiments conducted by the inventors and shown in graphs of FIGS. 24 and 25 with respect to low and high r.p.m. operations revealed that a combustion chamber structure according to the invention has improvements both in generation of black smoke and deterioration in fuel efficiency in comparison with a conventional combustion chamber structure.

FIGS. 24 and 25 are the graphs showing experimental results of a combustion chamber structure according to the invention relatively evaluated in terms of percentage, with experimental results of a conventional combustion chamber structure being standard (100%). In each of the figures, $NO_x$ emission is evaluated in abscissa and black smoke emission and fuel consumption required for a predetermined output are evaluated in upper and lower ordinates, respectively.

Moreover, in the embodiment, significance of the nozzle cone angle for fuel injection being set to the range of 140°-160°, the width L of the depression 24 in the radial direction being set to be at least 9% and at most 19% of the diameter d of the inlet lip 11 and the depth h of the inlet lip 11 relative to the top surface of the piston 9 being set to be at least 4.5% and at most 9.5% of the diameter of the inlet lip 11 will be detailed hereinafter.

Figure 26:
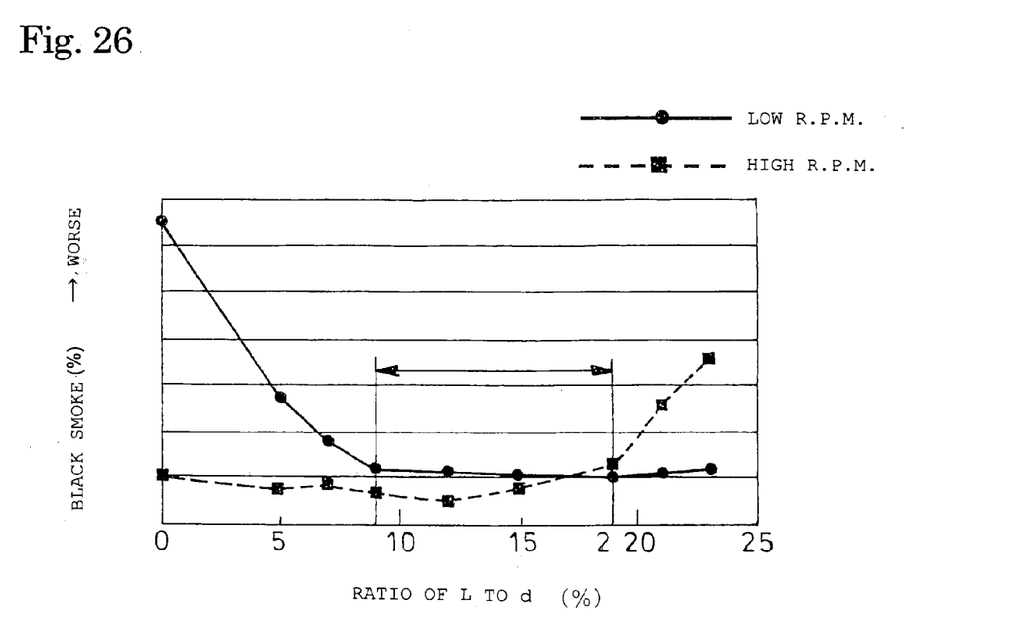
FIG. 26 is a graph for explanation of optimum range for width of depression in radiation direction.

As shown in FIG. 26 as graph, under the condition that the nozzle cone angle for the fuel injection is set to a range of 140°-160°, the ratio of the width L to the diameter d was gradually increased from 0% for low r.p.m. operation. It was confirmed that with the ratio being 9% or more, the black smoke reduction effect was remarkable.

It is considered that this is due to the fact that, by increasing in width L of the depression 24, the atomized fuel becomes readily dispersible to the squish area S where there is much oxygen (outer peripheral side of the cylinder is greater in volume than inner peripheral side and therefore has more oxygen), leading to enhancement of air utilization, whereby re-oxidization of soot is accelerated to greatly suppress generation of black smoke.

However, with respect to high r.p.m. operation, it was confirmed that the black smoke reduction effect is abruptly reduced when the ratio of the width L to the diameter d is 21% or more. It is considered that this is due to the fact that, with the excessively greater width of the depression 24, the atomized fuel reaches the liner wall.

Thus, taking these experimental results comprehensively into consideration, it is concluded to be optimum that the width L of the depression 24 in the radial direction is set to be at least 9% and at most 19% of the diameter d of the inlet lip 11. With this range, remarkable black smoke reduction effect can be obtained both in low and high r.p.m. operations.

Figure 27:
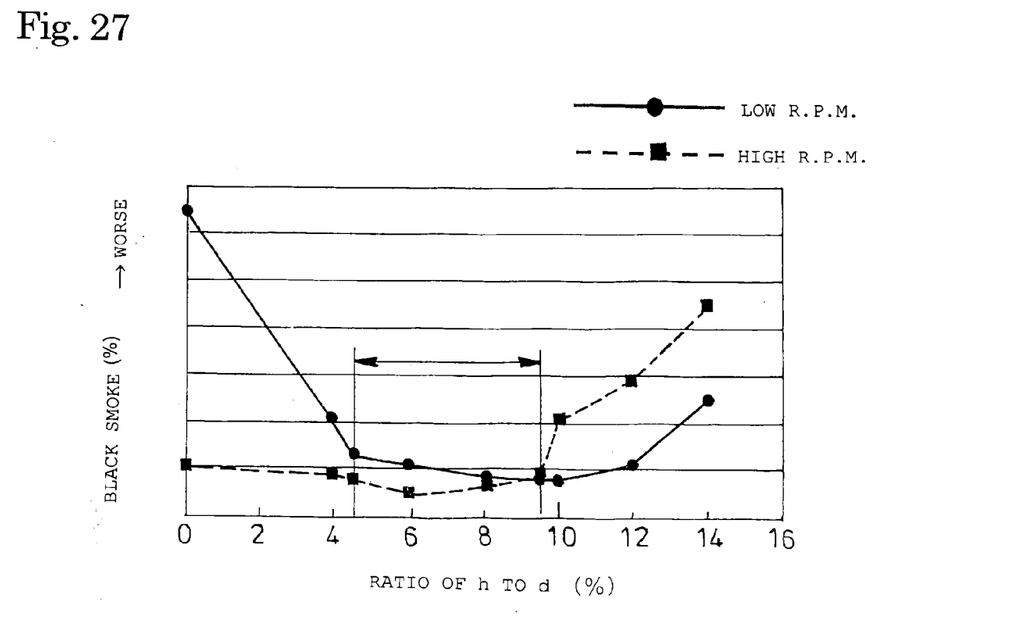
FIG. 27 is a graph for explanation of optimum range for depth of inlet lip.

Meanwhile, as shown in FIG. 27 as graph, under the condition that the nozzle cone angle for the fuel injection is set to a range of 140°-160°, the ratio of the depth h to the diameter d was gradually increased from 0% for low r.p.m. operation. It was confirmed that with the ratio being about between 4.5-12%, the black smoke reduction effect was remarkable.

It is considered that this is due to the fact that, by increasing in depth h of the inlet lip 11, the atomized fuel becomes readily dispersible to the squish area S where there is much oxygen, leading to enhancement of air utilization, whereby re-oxidization of soot is accelerated to greatly suppress generation of black smoke.

However, with respect to high r.p.m. operation, it was confirmed that the black smoke reduction effect was remarkable when, just like the case of low r.p.m. operation, the ratio of the depth h to the diameter d is about 4.5% or more and that the black smoke reduction effect is abruptly reduced when the ratio is 10% or more. It is considered that this is due to the fact that the depth h of inlet lip 11 is extremely increased to extremely increase the volume of the depression 24, resulting in reduction of air fluidity (squish) to be produced by the counter of the combustion chamber.

Thus, taking these experimental results comprehensively into consideration, it is concluded to be optimum that it is set to be at least 4.5% and at most 9.5% of the diameter d of the inlet lip 11. With this range, remarkable black smoke reduction effect can be obtained both in low and high r.p.m. operations.

It is to be noted that the reason why the ratio of the width L to the diameter d and the ratio of the dept h to the diameter d are set with the precondition that the nozzle cone angle for fuel injection is in a range of 140°-160° is because the change of nozzle cone angle in a range of 140°-160° is expected also in future, bearing in mind the fact that a typical nozzle cone angle in existing diesel engines 1 is about 155°.

Especially in recent years, timing of fuel injection tends to be delayed from a viewpoint of suppressing the generation of $NO_x$, such delayed timing of the fuel injection suppressing the combustion temperature due to reduction in pressure by lowering of the piston 9 to thereby suppress the generation of $NO_x$. This, however, causes the finish of the fuel blowing to be delayed in terms of crank angle and tends to bring about direct hit of the injected fuel against the liner wall during high r.p.m. operation, resulting in failures such as dilution of oil membrane. It has been thus conceived that the nozzle cone angle is reduced than ever before so as to avert such direct hit of the injected fuel against the liner wall; it has been assumed that the angle may be reduced to about 140°.

When such reduction in the nozzle cone angle for the fuel injection than ever before is applied to the conventional combustion chamber structure, it is evident that the tendency of most of the atomized fuel being dominantly directed into the cavity 10 becomes further remarkable during low r.p.m. operation. It therefore goes without saying that to employ the combustion chamber structure according to the embodiment has further enhanced significance when the nozzle cone angle is reduced than ever before for reduction of the generation of $NO_x$.

It is to be understood that a combustion chamber structure for a direct injection diesel engine according to the invention is not limited to the above embodiment and that various changes and modifications may be made without departing from the scope of the invention. In the embodiment shown, the cavity has been illustrated as reentrant-type one having a combustion chamber wall extending down from the inlet lip in moderate S-shaped curve and protruding radially outwardly of the inlet lip. Alternatively, it may be a toroidal cavity with a combustion chamber wall which extends vertically and has the same diameter as that of the inlet lip.

The invention claimed is:

1. A combustion chamber structure for a direct injection diesel engine having a cavity on a top surface of a piston, said cavity being concave to provide a majority of the combustion chamber, fuel being injected from a center of a cylinder top radially into said cavity to self-ignite, said combustion chamber structure comprising:
    a depression at an outer periphery of open of the cavity, said depression being sunken by a required depth relative to the top surface of the piston to provide a step, said depression having a bottom with an outer periphery gradually rising radially outwardly in modestly curved surface to the top surface of the piston such that an inlet lip is formed at a position lower than the top surface of the piston by an inner periphery of the bottom of said depression and a combustion chamber wall rising from a bottom of the cavity, wherein
    a width of the depression in a radial direction is at least 9% and at most 19% of a diameter of the inlet lip,
    a depth of the inlet lip relative to the top surface of the piston is at least 4.5% and at most 9.5% of the diameter of the inlet lip,
    a nozzle cone angle for fuel injection is in a range of 140°-160°, and
    atomized fuel flows around the inlet lip at least in an early phase of the injection.

* * * * *